(12) United States Patent
Zhang

(10) Patent No.: US 11,870,658 B2
(45) Date of Patent: Jan. 9, 2024

(54) METHOD AND APPARATUS FOR UPDATING GATEWAY RESOURCE, AND IOT CONTROL PLATFORM

(71) Applicants: ENVISION DIGITAL INTERNATIONAL PTE. LTD., Singapore (SG); SHANGHAI ENVISION DIGITAL CO., LTD., Shanghai (CN)

(72) Inventor: Hongzhen Zhang, Wuxi (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 26 days.

(21) Appl. No.: 18/002,383

(22) PCT Filed: Jun. 29, 2021

(86) PCT No.: PCT/SG2021/050380
§ 371 (c)(1),
(2) Date: Dec. 19, 2022

(87) PCT Pub. No.: WO2022/005401
PCT Pub. Date: Jan. 6, 2022

(65) Prior Publication Data
US 2023/0198856 A1  Jun. 22, 2023

(30) Foreign Application Priority Data

Jul. 2, 2020 (CN) .......................... 202010628606.5

(51) Int. Cl.
*H04L 41/14* (2022.01)
*H04L 12/66* (2006.01)
(Continued)

(52) U.S. Cl.
CPC ............ *H04L 41/145* (2013.01); *G16Y 30/00* (2020.01); *H04L 12/66* (2013.01); *H04L 45/563* (2013.01);
(Continued)

(58) Field of Classification Search
CPC ........... G06F 8/65; G16Y 30/00; H04L 12/66; H04L 41/145; H04L 45/563; H04N 21/26291; H04W 16/04
See application file for complete search history.

(56) References Cited

U.S. PATENT DOCUMENTS 10,581,756 B2 * 3/2020 Jubran .................... H04L 43/08
10,965,759 B2   3/2021 Anumala et al.
(Continued)

FOREIGN PATENT DOCUMENTS

| CN | 105141601 A | 12/2015 |
| CN | 109951559 A | 6/2019 |
| JP | 2018 045411 A | 3/2018 |

OTHER PUBLICATIONS

International Search Report (4 pages) dated Oct. 6, 2021 out of PCT Priority Application PCT/SG2021/050380.
(Continued)

*Primary Examiner* — Khaled M Kassim
*Assistant Examiner* — Kai Chang
(74) *Attorney, Agent, or Firm* — Crowell & Moring LLP; John C. Freeman

(57) ABSTRACT

A method and an apparatus for updating a gateway resource, and an Internet of Things (IoT) control platform, which belong to the field of IoT. The method is applicable to the IoT control platform connected to each gateway device, and the gateway device is connected to an IoT device. The method includes: acquiring a model change message including a change model identifier of a changed model, wherein
(Continued)

different IoT devices correspond to different models, and each model contains measuring point information of a measuring point in the IoT device; determining an associated template based on the change model identifier and updating the associated template, the associated template containing a corresponding relationship between the measuring point information and a measuring point identifier in the changed model, and the measuring point identifier being applicable to a measuring point data message sent by the IoT device; determining a target gateway device that uses the associated template; and issuing a gateway resource update package to the target gateway device, the target gateway device being configured to update the gateway resource based on the gateway resource update package.

9 Claims, 6 Drawing Sheets

(51) Int. Cl.
*G16Y 30/00* (2020.01)
*H04L 45/00* (2022.01)
*G06F 8/65* (2018.01)
*H04N 21/262* (2011.01)
*H04W 16/04* (2009.01)

(52) U.S. Cl.
CPC .......... *G06F 8/65* (2013.01); *H04N 21/26291* (2013.01); *H04W 16/04* (2013.01)

(56) References Cited

U.S. PATENT DOCUMENTS

| | | | |
|---|---|---|---|
| 11,121,932 B2* | 9/2021 | Nayyar | G06F 16/212 |
| 2016/0110183 A1* | 4/2016 | Fu | G06F 8/63 |
| | | | 717/169 |
| 2017/0147312 A1* | 5/2017 | Weber | G06F 8/656 |
| 2018/0196741 A1* | 7/2018 | Qureshi | G06F 8/60 |
| 2019/0280940 A1 | 9/2019 | Furuichi et al. | |
| 2020/0076896 A1 | 3/2020 | Anumala et al. | |
| 2020/0310847 A1* | 10/2020 | Schulze | H04L 67/10 |
| 2022/0311677 A1* | 9/2022 | Nomura | H04L 43/0876 |

OTHER PUBLICATIONS

Written Opinion (6 pages) dated Oct. 6, 2021 out of PCT Priority Application PCT/SG2021/050380.
International Preliminary Report on Patentability (18 pages) out of PCT Priority Application PCT/SG2021/050380.
Notification of Reasons for Refusal (4 pages) dated Jun. 15, 2023 out of corresponding Japanese Patent Application No. 2022-572802.

* cited by examiner

Current total gateway resource content

METHOD AND APPARATUS FOR UPDATING GATEWAY RESOURCE, AND IOT CONTROL PLATFORM

This application is a national application based on Patent Cooperation Treaty Patent Application No. PCT/SG2021/050380, filed on Jun. 29, 2021, the entire contents of which are incorporated herein by reference.

This application claims under 35 U.S.C. § 119(a) the benefit of the filing date of Chinese Patent Application No. 202010628606.5, filed on Jul. 2, 2020, the entire contents of which are incorporated herein by reference.

BACKGROUND OF THE INVENTION

Field of Invention

Embodiments of the present disclosure relate to the field of Internet of Things (IoT), and in particular, relate to a method and an apparatus for updating a gateway resource, and an IoT control platform.

Description of Related Art

In an IoT system, a gateway device is an intermediate device for implementing data exchange and communication between a terminal application layer and a network layer. The gateway device can manage an accessed IoT device and interchange data with the accessed IoT device based on its access capability, manageability and protocol conversion capability.

In the related art, the main resource update methods are as follows: manual offline update by a technician; remote online update; and update in a configuration page of the gateway device by the technician.

In the offline update method in the related art, the technician is required to manually update the resource of each gateway device, resulting in lower update efficiency. In the online mode, it is necessary to update all IoT devices connected to the gateway devices in a unified fashion, which requires update of a relatively large amount of data and largely depends on a current network situation. In terms of the update in the configuration page of the gateway device, it is required to additionally provide a configuration module service in the gateway device, which occupies a physical resource of the gateway device.

SUMMARY

The embodiments of the present disclosure provide a method and an apparatus for updating a gateway resource, and an IoT control platform. The technical solutions are as follows.

In one aspect, a method for updating a gateway resource is provided according to an embodiment of the present disclosure. The method is applicable to an IoT control platform connected to each gateway device, and the gateway device is connected to an IoT device; and the method includes:

acquiring a model change message including a change model identifier of a changed model, wherein different IoT devices correspond to different models, and each model contains measuring point information of a measuring point in the IoT device;

determining an associated template based on the change model identifier and updating the associated template, the associated template containing a corresponding relationship between the measuring point information and a measuring point identifier in the changed model, and the measuring point identifier being applicable to a measuring point data message sent by the IoT device;

determining a target gateway device that uses the associated template; and issuing a gateway resource update package to the target gateway device, the target gateway device being configured to update the gateway resource based on the gateway resource update package.

In another aspect, an apparatus for updating a gateway resource is provided according to an embodiment of the present disclosure. The apparatus is applicable to an IoT control platform connected to each gateway device, and the gateway device is connected to an IoT device; and the apparatus includes:

a message acquiring module, configured to acquire a model change message including a change model identifier of a changed model, wherein different IoT devices correspond to different models, and each model contains measuring point information of a measuring point in the IoT device;

a template updating module, configured to determine an associated template based on the change model identifier and update the associated template, the associated template containing a corresponding relationship between the measuring point information and a measuring point identifier in the changed model, and the measuring point identifier being applicable to a measuring point data message sent by the IoT device;

a gateway determining module, configured to determine a target gateway device that uses the associated template; and a resource updating module, configured to issue a gateway resource update package to the target gateway device, the target gateway device being configured to update the gateway resource based on the gateway resource update package.

In still another aspect, an IoT control platform is provided according to an embodiment of the present disclosure. The IoT control platform includes a processor and a memory storing at least one instruction, at least one program, a code set, or an instruction set, wherein the at least one instruction, the at least one program, the code set, or the instruction set, when loaded and executed by the processor, causes the processor to perform the method for updating the gateway resource as defined in the above aspect.

In yet another aspect, a computer-readable storage medium is provided according to an embodiment of the present disclosure. The computer-readable storage medium stores at least one instruction, at least one program, a code set, or an instruction set, wherein the at least one instruction, the at least one program, the code set, or the instruction set, when loaded and executed by a processor, causes the processor to perform the method for updating the gateway resource as defined in the above aspect.

In still yet another aspect, a computer program product is further provided according to an embodiment of the present disclosure. The computer program product stores at least one instruction, wherein the at least one instruction, when loaded and executed by a processor, causes the processor to perform the method for updating the gateway resource as defined in the above aspect.

In the embodiments of the present disclosure, the IoT control platform determines the associated template based on the change model identifier in the model change message, updates the associated template, further determines the target gateway device that uses the associated template, and finally issues the gateway resource update package to the target gateway device, such that the target gateway device can update the gateway resource based on the gateway resource update data package. Through the method according to the present disclosure, in case of a model change, the IoT control platform can automatically package the gateway resource to be updated to replace a manual update mode in the related art. In addition, the gateway resource update package to be released corresponds to the gateway resource update of the target gateway device, such that the IoT control platform is prevented from updating a resource of the gateway device that does not need resource update, thereby further improving the accuracy and the update efficiency in updating the gateway resource.

DETAILED DESCRIPTION

Figure 1:
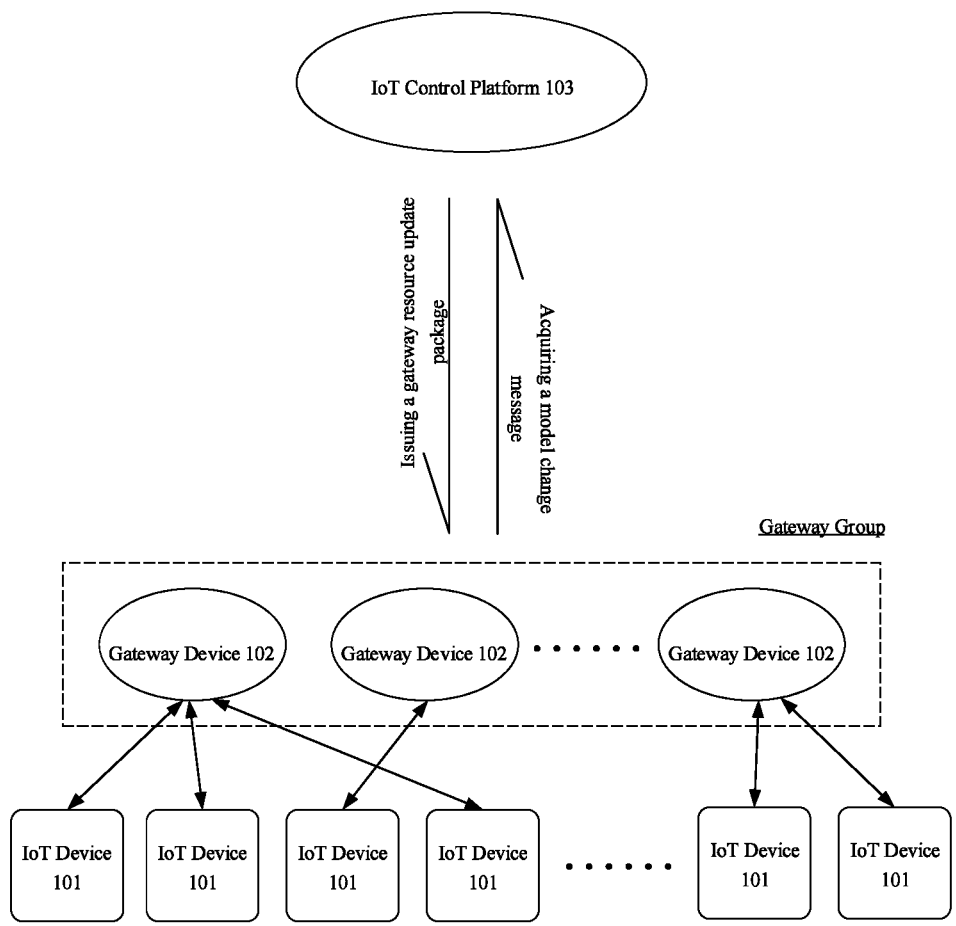
FIG. 1 is a schematic diagram of an implementation environment according to an exemplary embodiment of the present disclosure.

For clearer descriptions of the objectives, technical solutions, and advantages of the present disclosure, the embodiments of the present disclosure are described in detail hereinafter with reference to the accompanying drawings.

The term "plurality" herein refers to two or more. The term "and/or" describes association relationships of the associated objects, and may indicate three relationships. For example, "A and/or B", may indicate that A exists alone, or A and B exist simultaneously, or B exists alone. The character "/" generally indicates that the context objects are in an "or" relationship.

For convenience of understanding, the terms involved in the embodiments of the present disclosure are described below.

Internet of Things (IoT) system: the IoT system is an important part of a new generation of information technology, is an extension and expansion network based on the internet, and can realize data exchange and communication between any objects. In the related art, the IoT may be divided into four levels: a terminal application layer, a network layer (which is further divided into a network access layer and a core layer), a device management layer, and a background application layer. Herein, the terminal application layer of the IoT is the most representative of the characteristics of the IoT, and is composed of various terminal devices. The IoT system is operating system software that runs on the above terminal devices to control and manage the terminal devices, and provides a unified programming interface.

IoT device: in the embodiments of the present disclosure, the IoT device refers to a terminal device on the terminal application layer in the IoT, and may be, for example, various sensors, smart terminals, credit card machines, smart cards and other terminal devices.

Gateway device: the terminal application layer and the network layer are different types of networks. Based on factors such as different types of networks having different protocols, an intermediate device is required between the terminal application layer and the network layer to realize protocol conversion and other responsibilities, so as to realize data exchange and communication between the terminal application layer and the network layer; and the intermediate device is the gateway device. In addition, the gateway device also has an extensive access capability and device management capability. That is, a plurality of IoT devices may access the gateway device simultaneously, and the gateway device can manage the accessed IoT devices. It should be noted that, in the IoT system, the gateway device specifically refers to the IoT gateway device.

Measuring point: when the IoT device transmits data to the network layer by the gateway device, the transmitted data may be pre-stored data or data collected at the measuring point of the device. If the IoT device is a wind turbine, possible measuring points may be a geographic location measuring point, a temperature measuring point, a humidity measuring point, and the like.

Specification: in the embodiments of the present disclosure, when the IoT device sends the data collected at the measuring point to the gateway device, it needs to generate a measuring point data message based on the measuring point and the data according a certain specification. The gateway device analyzes the message according to the same specification after receiving the message.

Measuring point information: for the convenience of data transmission, a specific measuring point is replaced with mapping information (namely, measuring point information). Therefore, the measuring point data message generated by the IoT device at least includes a data field and a measuring point field, wherein the measuring point field is configured to store the mapping information corresponding to the measuring point. For example, the mapping information corresponding to the geographic location measuring point is A, the mapping information corresponding to the temperature measuring point is B, and the mapping information corresponding to the humidity measuring point is C. The gateway device acquires the measuring point information corresponding to the measuring point by analyzing the measuring point data message.

Template: in the embodiments of the present disclosure, the template is configured to store a mapping relationship between the measuring point and the measuring point information. For example, if the measuring point information of A is acquired based to a message analysis result, the geographic location measuring point corresponding to the measuring point information can be determined based to the mapping relationship stored in the template. In addition, in case that the measuring point and the measuring point information correspondingly have a measuring point identifier, the template is further configured to store a corresponding relationship between the measuring point information and the measuring point identifier, and uniquely mark the measuring point and the measuring point information through the measuring point identifier.

Model: gateway models corresponding to the gateway devices are unchanged, while the models of the IoT devices are different. Therefore, in the embodiments of the present disclosure, the model specifically refers to the model corresponding to the IoT device. In the model corresponding to each IoT device, the model contains the measuring point information of the measuring point in the IoT device. That is, all the corresponding measuring point information may be acquired based on the model identifiers of the models.

Based on the manageability of the gateway device to the IoT device, the gateway device in the IoT system updates information of accessed devices (namely, the IoT device information) and related protocol specifications from time to time, such that the gateway device also has the ability to update the resource. In the related art, the main resource update methods are as follows: manual offline update by a technician; remote online update; and update in a configuration page of the gateway device by the technician.

However, with respect to the resource update methods in the related art, in the offline mode, the technician is required to manually update the resource of each gateway device, resulting in lower update efficiency. In the online mode, it is necessary to update all IoT devices connected to the gateway devices in a unified fashion, which requires update of a relatively large amount of data and largely depends on a current network situation. In terms of the update in the configuration page of the gateway device, it is required to additionally provide a configuration module service in the gateway device, which occupies a physical resource of the gateway device In order to solve the above problems when the gateway device updates the resource in the related art, the present disclosure provides a method for updating a gateway resource. Through the method, gateway resources to be updated of gateway devices can be automatically packaged, and are released to the gateway devices respectively, thereby realizing the gateway resource update at the gateway devices. Refer to FIG. 1 which is a schematic diagram of an implementation environment according to an exemplary embodiment of the present disclosure. The implementation environment includes IoT devices 101, a gateway group (consisting of gateway devices 102), and an IoT control platform 103.

The IoT device 101 is a terminal device in the terminal application layer of the IoT system. The IoT device 101 may be a terminal device capable of realizing single data acquisition, or a terminal device capable of realizing data acquisition based on a plurality of measuring points. In different application scenes of the IoT system, the types of the IoT devices 101 are different. If the IoT system is used for system perception, comprehensive analysis and processing of each logistics link, the IoT device 101 may be a computer device in each logistics link, and the computer device is used for monitoring and recording logistics data of a corresponding logistics link. If the IoT system is used for remotely monitoring a new energy production process, the IoT device 101 may be a wind turbine, and each device in the wind turbine includes a plurality of measuring points, such as a geographic location measuring point and a real-time temperature measuring point. The above possible application scenes are only illustrative examples, and do not limit the application scenes of the IoT system in the present disclosure. The possible application scenes may refer to transportation, security, energy and environmental protection, medical care, construction, manufacturing, home furnishing, retail, agriculture, and the like. Moreover, in addition to data acquisition and transmission, the IoT device 101 further has certain data processing and storage capabilities, such as classifying and storing the data of the measuring points.

The IoT device 101 is connected to any one of the gateway devices 102 included in the gateway group through a wired or wireless network. Herein, the gateway device 102 can realize data exchange and communication between the IoT device 101 and the network layer. In some embodiments, the gateway device 102 receives data sent by a plurality of IoT devices 101 and converts the data into a predetermined format which meets a current communication protocol of the network layer. Further, the gateway device 102 sends the converted data to the network layer. Correspondingly, the gateway device 102 can further receive data of the network layer, convert the format of the received data, and send the converted data to the corresponding IoT devices 101.

The gateway device 102 and the IoT control platform 103 in the IoT system are connected through the wired or wireless network. Herein, the IoT control platform 103 is a cloud device in the IoT system, and is configured to receive data sent by the gateway device 102, and store, process and analyze the device data. Optionally, the IoT control platform 103 may be a server, or a server cluster composed of several servers, or a cloud computing center. Optionally, the IoT control platform 103 includes a storage unit for storing IoT device information, gateway device information, and the like. Optionally, the IoT control platform 103 may further include a management unit for managing gateway devices 102 capable of performing data interaction and the IoT devices 101 associated with all the gateway devices 102; and the management unit is configured to, such as, update resources of the IoT devices 101, and monitor and manage the IoT devices 101. Optionally, the IoT control platform 103 may further include a file server for realizing the function of the storage unit, or for storing data different from the data in the storage unit. For example, the storage unit is configured to store data currently received and to be sent, and the file server is configured to store history data during the data exchange and communication process.

Based on the above implementation environment, the method for updating the gateway resource according to the present disclosure can be realized. Different IoT devices 101 may contain different or the same measuring points, such as two wind turbines mounted in different regions. In case that the device types of the IoT devices 101 are the same and the data acquisition types are also the same, the same template is adopted to store the data in the process of data acquisition, storage and transmission. Correspondingly, the gateway device 102 can realize unified management of templates for the accessed IoT devices 101. In case that the measuring point information of an IoT device 101 changes, that is, the data in the template corresponding to the IoT device 101 changes, the IoT control platform 103 needs to update the template, such that the gateway device 102 can use the updated template to store and manage the data when managing other IoT devices 101 that use the template. With the method for updating the resource according to the present disclosure, if there is the model change, the IoT control platform 103 acquires the model change message, and automatically packages the gateway resource related to template update after receiving the model change message, without adopting the manual updating ways in the related art. In addition, the IoT control platform 103 determines a gateway device 102 whose gateway resource is to be updated upon the completion of the automatic packaging of the gateway resource. Furthermore, the gateway resource update package generated by automatic packaging is released on the gateway device 102. After successful release, the gateway device 102 updates the template corresponding to the connected IoT device 101 based on the content of the gateway resource update package, such that the gateway device 102 can store data of and manage all IoT devices 101 that use the template by the updated template.

Figure 2:
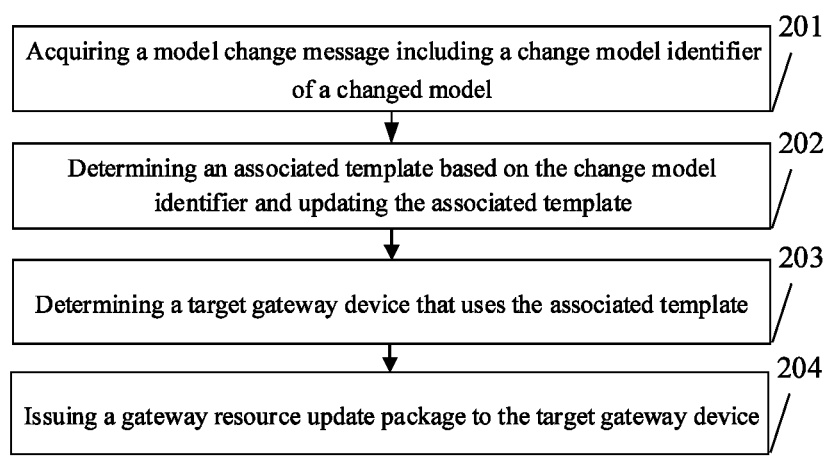
FIG. 2 is a flowchart of a method for updating a gateway resource according to an exemplary embodiment of the present disclosure.

Refer to FIG. 2 which is a flowchart of a method for updating a gateway resource according to an exemplary embodiment of the present disclosure. The method is applicable to the IoT control platform shown in FIG. 1, and includes the following steps.

In 201, a model change message is acquired, wherein the model change message includes a change model identifier of a changed model.

Optionally, a gateway group includes a plurality of gateway devices, and each gateway device can manage and update a template of an accessed IoT device.

In some embodiment, the IoT control platform is provided with a model module including a model of the gateway device and all models corresponding to the IoT device. Herein, the model of the gateway device is a fixed public model; and in all the models corresponding to the IoT devices, a plurality of IoT devices may correspond to the same model.

When a technician operates the IoT control platform, that is, when there is the model change, the model module sends the model change message, and the IoT control platform receives the model change message by a listening module. Optionally, the model change message includes the change model identifier of the changed model, and the change model identifier is configured to uniquely identify the changed model.

Optionally, the model includes measuring point information of measuring points in the IoT device, and there is a mapping relationship between the measuring points and the measuring point information. For example, if the measuring point information of A corresponds to the geographic location measuring point of the device, A is the measuring point information after the device measuring point is mapped.

In 202, an associated template is determined based on the change model identifier, and is updated.

After acquiring the model change message, the IoT control platform acquires the change model identifier based on the model change message. The change model identifier is configured to mark the currently changed model. Further, the IoT control platform can acquire all pieces of measuring point information currently corresponding to the change model identifier based on the change model identifier in the model change message, and correspondingly query the associated template based on the change model identifier. The associated template stores a corresponding relationship between measuring point information and measuring point identifiers in changed models; and the measuring point identifier is applicable to the measuring point data message sent by the IoT device.

The measuring point data message generated by the IoT device at least includes a data field and a measuring point field, wherein the measuring point field is configured to store mapping information corresponding to the measuring point (namely, the measuring point information). For example, the mapping information corresponding to the geographic location measuring point is A, the mapping information corresponding to the temperature measuring point is B, and the mapping information corresponding to the humidity measuring point is C. The gateway device acquires the measuring point information corresponding to the measuring point by analyzing the measuring point data message.

In addition, since the measuring point information is prone to change if the model is changed, it is necessary to add the measuring point identifier to the measuring point data message. Each piece of the measuring point information corresponds to a unique measuring point identifier.

In some embodiments, the IoT control platform determines the associated template corresponding to the change model identifier based on an association relationship between all the model identifiers and all the templates. The changed model includes the measuring point identifiers corresponding to the measuring point information, respectively. Further, the IoT control platform acquires the current measuring point information in the changed model based on the measuring point identifier corresponding to each piece of the measuring point information, and acquires history measuring point information corresponding to each measuring point in the associated template based on the measuring point identifier. The IoT control platform determines a measuring point to be updated corresponding to the associated template by comparing the current measuring point information and the history measuring point information.

In an example, if the technician changes a mapping relationship between a temperature measuring point and B to a mapping relationship between the temperature measuring point and B1, the measuring point information B is changed in the model. For example, the technician adds a new measuring point in the IoT device and sets measuring point information D to form a mapping relationship between the measuring point information D and the newly added measuring point, there is a newly added measuring point information D in the model. In another example, if the technician deletes the temperature measuring point in the IoT device, the measuring point information B does not exist in the model.

Therefore, the measuring point to be updated is at least one of the newly added measuring point, the deleted measuring point and the changed measuring point.

Since the associated template may not only be applicable to one IoT device but also be a common template for the plurality of IoT devices and the gateway device has the manageability to the IoT device, the history measurement point information stored in the associated template is required to be updated after the measuring point to be updated corresponding to the associated template is determined based on the change model identifier.

In some embodiments, the IoT control platform acquires an updated associated template by updating the associated template based on the measuring point information corresponding to the measuring point to be updated. If the measuring point to be updated is the deleted measuring point, history measuring point information corresponding to the measuring point is deleted in the template, such that the gateway device can apply the updated associated template to the IoT device when managing the accessed IoT device.

In 203, a target gateway device that uses the associated template is determined.

The gateway device is connected to a plurality of IoT devices, and meanwhile, further manages templates of the accessed IoT devices. Therefore, after the IoT control platform completes the update of the associated template, a gateway resource of the target gateway device involved in the management of the associated template is required to be updated, and an IoT device that uses the associated template accesses the target gateway device.

Optionally, prior to updating the gateway resource of the target gateway device involved in the management of the associated template, it is necessary to determine the target gateway device from all the gateway devices. The IoT control platform acquires the gateway device information associated with the associated template, and the gateway device information includes the device information of the target gateway device. Herein, the device information may be an identifier of the gateway device, and the gateway device information includes an identifier of the target gateway device.

In 204, a gateway resource update package is issued to the target gateway device.

In some embodiments, the IoT control platform constructs a current total gateway resource of the target gateway device based on the gateway device information, and constructs a current gateway resource update package by comparing the current total gateway resource with a history total gateway resource.

Further, the IoT control platform issues the gateway resource update package to the target gateway device, and the target gateway device is configured to update the gateway resource based on the gateway resource update data package.

In summary, in the embodiment of the present disclosure, the IoT control platform determines the associated template based on the change model identifier in the model change message, updates the associated template, further determines the target gateway device that uses the associated template, and finally issues the gateway resource update package to the target gateway device, such that the target gateway device can update the gateway resource based on the gateway resource update data package. Through the method according to the present disclosure, in case of the model change, the IoT control platform can automatically package the gateway resource to be updated to replace a manual update mode in the related art. In addition, the gateway resource update package to be released corresponds to the gateway resource update of the target gateway device, such that the IoT control platform is prevented from updating a resource of the gateway device that does not need resource update, thereby further improving the accuracy and the update efficiency in updating the gateway resource.

Through the method for updating the gateway resource according to the present disclosure, the IoT control platform can automatically package the gateway resource to be updated. Then, in the process of releasing the gateway resource update package, if releasing fails, the whole gateway resource update package needs to be rolled back to determine an error reason. To this end, in order to shorten a time in identifying an error when the error occurs in the release of the gateway resource update package, the method further includes the following content based on the above embodiments.

Figure 3:
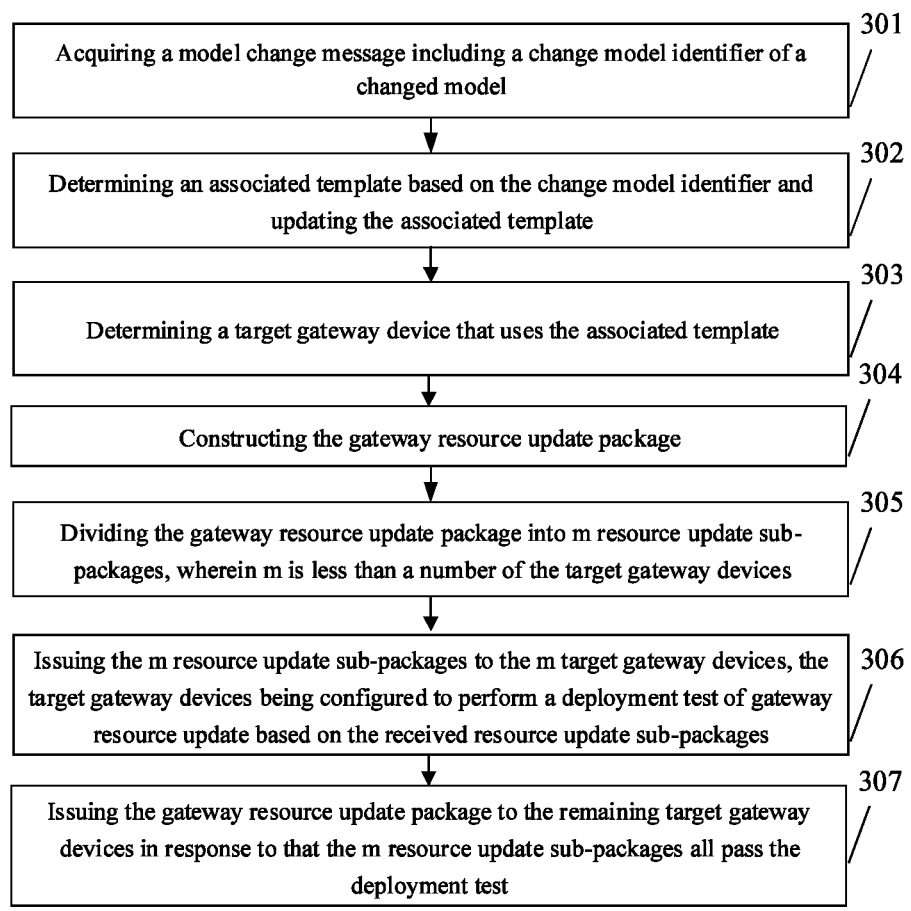
FIG. 3 is a flowchart of a method for updating a gateway resource according to another exemplary embodiment of the present disclosure.

Refer to FIG. 3 which is a flowchart of a method for updating a gateway resource according to another exemplary embodiment of the present disclosure. The method is applicable to the IoT control platform shown in FIG. 1, and includes the following steps.

In 301, a model change message is acquired, wherein the model change message includes a change model identifier of a changed model.

Optionally, refer to step 201 for the details of this step which is not repeated in the embodiment of the present disclosure herein.

In 302, an associated template is determined based on the change model identifier, and is updated.

Optionally, refer to step 202 for the details of this step which is not repeated in the embodiment of the present disclosure herein.

In 303, a target gateway device that uses the associated template is determined.

Optionally, refer to step 203 for the details of this step which is not repeated in the embodiment of the present disclosure herein.

In 304, a gateway resource update package is constructed.

Optionally, 304 includes the following 1 to 5.

1. The IoT control platform determines an incremental gateway resource in response to a change in the gateway resource.

The IoT control platform acquires a changed gateway resource in response to the change in the gateway resource, and determines the changed gateway resource as the incremental gateway resource.

The current total gateway resource update package contains relevant data of each IoT device. If the IoT control platform determines the gateway device to be updated based on a comparison result of hash values, in some embodiments, the IoT control platform screens out the incremental gateway resource from the current total gateway resource based on the device information of the gateway device to be updated.

If the device information of the IoT device is a device identifier and the associated template and the specification information may be determined based on the device identifier, the IoT control platform screens out the incremental gateway resource from the current total gateway resource based on the device identifier of the gateway device to be updated.

2. The IoT control platform acquires a history total gateway resource of the target gateway device, and constructs a current total gateway resource based on the history total gateway resource and the incremental gateway resource.

The IoT control platform updates the gateway resource of the target gateway device by releasing a gateway resource update package. Prior to releasing the gateway resource update package, the gateway resource update package is required to be constructed.

In the embodiments of the present disclosure, the IoT control platform first constructs the current total gateway resource of the target gateway device. The current total gateway resource refers to a resource that can fully cover the history total gateway resource of the target gateway device. Optionally, the current total gateway resource update includes IoT device information and specification information associated with the target gateway device. Herein, the IoT device information may be a device identifier for uniquely identifying the IoT device. The specification information is configured to standardize a data upload format of the IoT device. Before the IoT device sends the data collected by the measuring point to the gateway device, it needs to generate the measuring point data message based on the measuring point and the data under a certain specification; and the gateway device analyzes the content of the measuring point data message through the same specification after receiving the measuring point data message.

Figure 4:
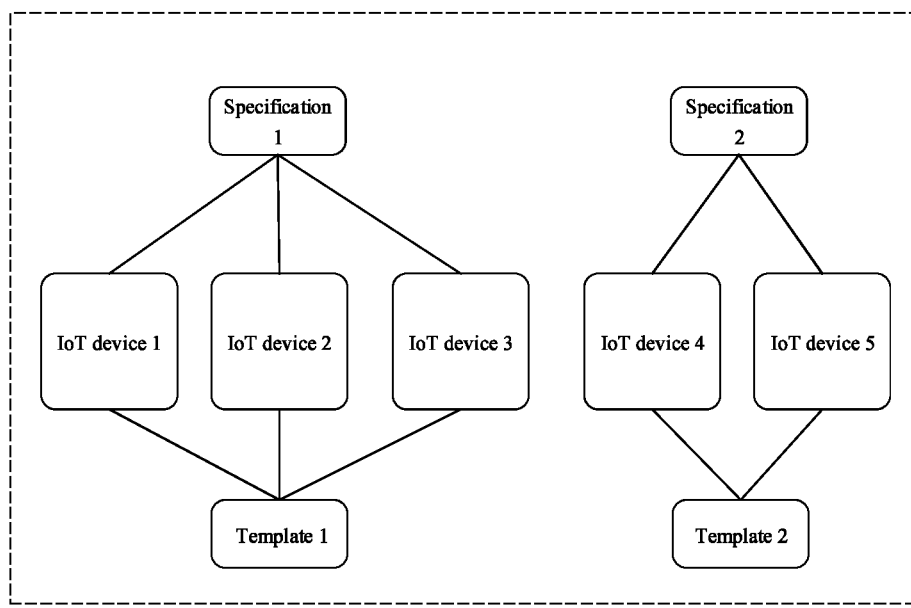
FIG. 4 is a schematic diagram of contents included in a current total gateway resource according to an exemplary embodiment of the present disclosure.

In an exemplary embodiment, as shown in FIG. 4 which is a schematic diagram of contents included in the current total gateway resource update, devices 1 to 5 access the target gateway device. Herein, devices 1 to 3 use template 1, and devices 4 and 5 use template 2. Moreover, the specification used in the generation of the devices 1 to 3 is specification 1, and the specification used in the generation of the devices 4 and 5 is specification 2.

In the present disclosure, the current total gateway resource can be automatically packaged. That is, a first resource packaging task instructing to construct the current total gateway resource of the target gateway device is automatically generated. In addition, the method according to the present disclosure further includes a construction task of the current total gateway resource triggered manually by a technician on a configuration interface. That is, a second resource packaging task is automatically generated, and is the resource construction task triggered manually. Herein, the second resource packaging task has the priority to execute. Thus, the content 1 includes: generating the first resource packaging task and putting the first resource packaging task in the lag queue; and executing the first resource packaging task in response to the completion of the second resource packaging task in the priority queue.

After the first resource packaging task is generated, the IoT control platform puts the first resource packaging task into the lag queue. After the second resource packaging task is generated, the IoT control platform puts the second resource packaging task into the priority queue. Further, the IoT control platform executes the first resource packaging task upon the completion of the second resource packaging task in the priority queue.

3. The IoT control platform calculates a first hash value based on the history total gateway resource, and calculates a second hash value based on the current total gateway resource.

The IoT control platform further acquires the history total gateway resource of the target gateway device upon the completion of the construction of the current total gateway resource.

Considering that if the current total gateway resource update package is released directly, the IoT control platform will update an unnecessary resource. That is, there is duplicate data between the current total gateway resource and the history resource.

Therefore, in order to update the resource more pertinently and shorten the resource update time, in some embodiments, the IoT control platform compares the current total gateway resource with the history total gateway resource to construct the gateway resource update package based on a comparison result, wherein the history total gateway resource may be stored in a storage unit of the IoT control platform, or may be stored in a file server.

In the embodiments of the present disclosure, the IoT control platform maps big data corresponding to the history total gateway resource into smallish data by a hash algorithm. This piece of the smallish data is the first hash value of the big data. Similarly, the IoT control platform calculates the second hash value based on the current total gateway resource.

Herein, the hash value is unique. That is, once the big data changes, the corresponding hash value also changes. Therefore, the hash value is often configured to determine whether two pieces of data are the same.

4. The IoT control platform determines a gateway device to be updated in response to that the first hash value is different from the second hash value.

The IoT control platform compares the first hash value and the second hash value based on characteristics and functions of hash values, and determines whether the gateway resource changes in response to the same or different first and second hash values. If the first hash value and the second hash value are the same, it indicates that the current total gateway resource is consistent with the history total gateway resource, and the gateway resource does not change. If the first hash value is different from the second hash value, it indicates that the current total gateway resource is inconsistent with the history total gateway resource, and the gateway resource changes.

In some embodiments, in order to update the gateway resource more accurately, the IoT control platform may determine the gateway device to be updated based on the comparison result of the hash values. In the process of calculating the hash values of the current total gateway resource and the history total gateway resource, the hash value of data related to each IoT device may be calculated, such that an identifier of the IoT device having different hash values corresponding to the current total gateway resource and the history total gateway resource is marked. That is, the gateway device to be updated is determined. Herein, the data related to the IoT device includes a corresponding template and specification information. In an example, as shown in FIG. 4, if template 1 is the associated template, it is determined that gateway devices to be updated are the IoT devices corresponding to template 1, namely, the IoT devices 1 to 3, by comparing the current total gateway resource with the history total gateway resource.

5. The IoT control platform constructs a gateway resource update package based on the current total gateway resource.

So far, the IoT control platform determines the incremental gateway resource that actually needs to be released. Further, the IoT control platform acquires the gateway resource update package by packaging the incremental gateway resource.

In 305, the gateway resource update package is divided into m resource update sub-packages, wherein m is less than a number of the target gateway devices.

Before issuing the gateway resource update package to the target gateway device, the IoT control platform tests the gateway resource to be released in an incremental release fashion.

In some embodiments, the IoT control platform divides the gateway resource update package into m resource update sub-packages. For the test process, in order to realize the gateway resource deployment test by only a relatively small number of gateway devices, m is less than a number of the target gateway devices.

In 306, the m resource update sub-packages are issued to the m target gateway devices, wherein the target gateway devices are configured to perform a deployment test of gateway resource update based on the received resource update sub-packages.

After dividing the gateway resource update package into the m resource update sub-packages, the IoT control platform releases the m resource update sub-packages to the m target gateway devices in the target gateway devices to perform the deployment test. The target gateway devices are configured to perform the deployment test of the gateway resource update based on the received resource update sub-packages. Optionally, the IoT control platform may select the m target gateway devices from all the target gateway devices sequentially, or select the m target gateway devices from all the target gateway devices randomly, which is not limited in the embodiments of the present disclosure.

In 307, the gateway resource update package is issued to remaining target gateway devices in response to that the m resource update sub-packages all pass the deployment test.

Further, if all m resource update sub-packages are deployed and pass the deployment test, it indicates that the gateway resource update package has no possibility of an error in release, and the IoT control platform can issue the gateway resource update package to the remaining target gateways devices.

In the embodiment of the present disclosure, after the gateway resource to be updated is automatically packaged, the content of incremental release of the gateway resource update package is also included, so as to realize the deployment test of the gateway resource update package. If there is a resource update sub-package that fails to release, this resource update sub-package that has an error can be located directly, and then, the whole gateway resource update package does not need to be rolled back. Thus, if there is the error during the release of the gateway resource update package, time spent on error location can be further shortened.

Figure 5:
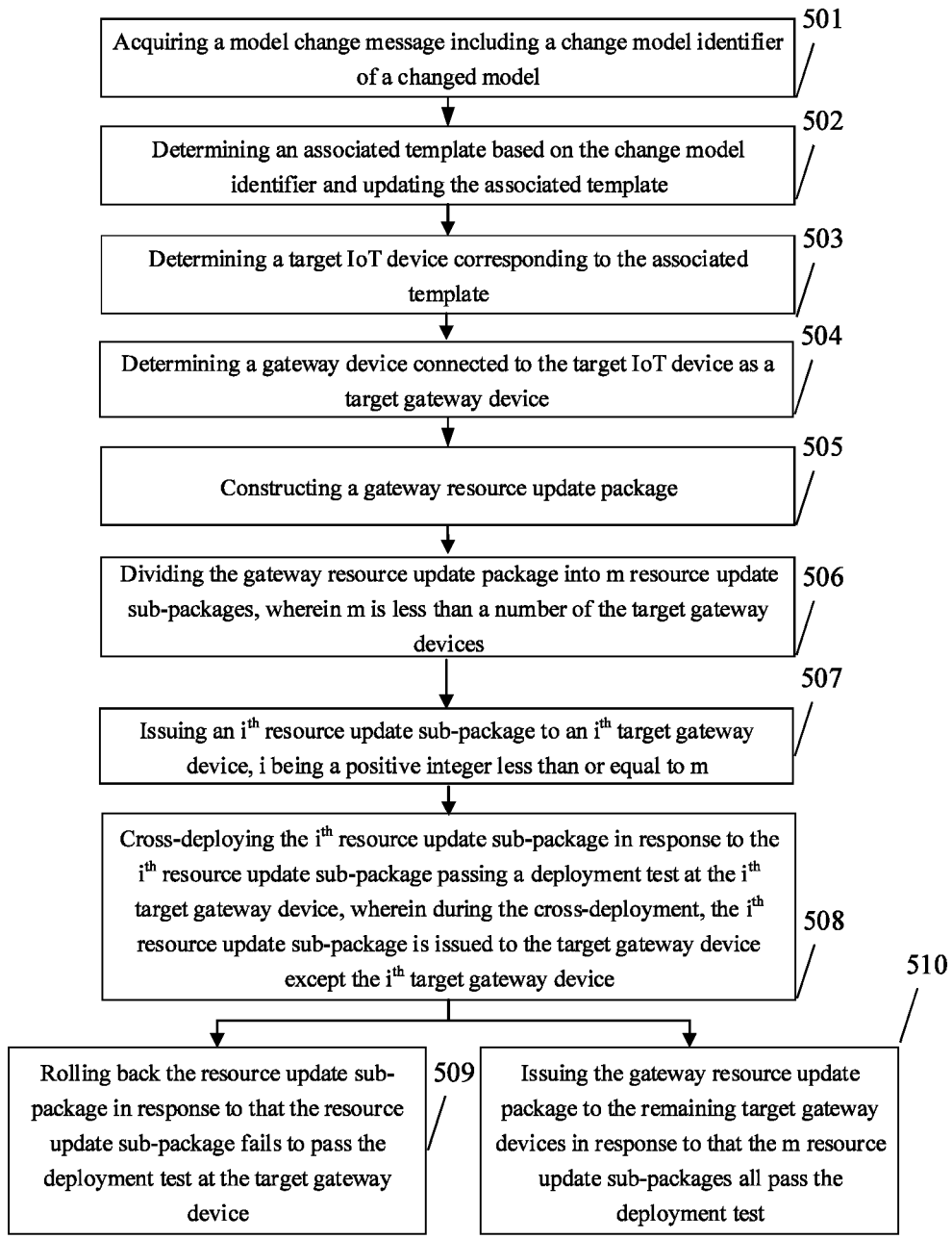
FIG. 5 is a flowchart of a method for updating a gateway resource according to yet another exemplary embodiment of the present disclosure.

Refer to FIG. 5 which is a flowchart of a method for updating a gateway resource according to another exemplary embodiment of the present disclosure. The method is applicable to the IoT control platform shown in FIG. 1, and includes the following steps.

In 501, a model change message is acquired, wherein the model change message includes a change model identifier of a changed model.

Optionally, refer to step 201 for the details of this step which is not repeated in the embodiment of the present disclosure herein.

In 502, an associated template is determined based on the change model identifier, and is updated.

Optionally, refer to step 202 for the details of this step which is not repeated in the embodiment of the present disclosure herein.

In 503, a target IoT device corresponding to the associated template is determined.

In order to update the gateway resource of the target gateway device involved in managing the associated template, the IoT control platform needs to determine the target gateway device based on the associated template upon the completion of the update of the associated template.

In some embodiments, the IoT control platform first determines the target IoT device corresponding to the associated template. Since the target IoT device is connected to the target gateway device, the target gateway device is determined.

In 504, the gateway device connected to the target IoT device is determined as the target gateway device.

Further, the IoT control platform determines the gateway device connected to the target IoT device as the target gateway device.

In the embodiment of the present disclosure, considering a sending frequency of the model change message, prior to constructing the current total gateway resource, the content of constructing a gateway set is also included, such that a task of constructing a current total gateway resource by the IoT control platform with a high frequency in a short time can be avoided if the sending frequency of the model change message is higher.

In some embodiments, the IoT control platform constructs the gateway set based on the target gateway device. The gateway set is configured to store target gateway device information. The target gateway device information includes device information of the target gateway device. If the device information is an identifier of the target gateway device, the target gateway device information includes the identifier of the target gateway device.

As explained above, the construction of the gateway set is to avoid the task of constructing the current total gateway resource by the IoT control platform with the high frequency in a short time. Therefore, in the embodiment of the present disclosure, the IoT control platform regularly acquires the target gateway device information from the gateway set.

In 505, a gateway resource update package is constructed.

Optionally, refer to step 304 for the details of this step which is not repeated in the embodiment of the present disclosure herein.

In 506, the gateway resource update package is divided into m resource update sub-packages, wherein m is less than a number of the target gateway devices.

Optionally, refer to step 305 for the details of this step which is not repeated in the embodiment of the present disclosure herein.

In 507, an $i^{th}$ resource update sub-package is issued to an $i^{th}$ target gateway device, wherein i is a positive integer less than or equal to m.

In some embodiments, the IoT control platform sequentially deploys m resource update sub-packages on m target gateway devices. Herein, the IoT control platform issues the $i^{th}$ resource update sub-package to the $i^{th}$ target gateway device, wherein i is a positive integer less than or equal to m.

Figure 6:
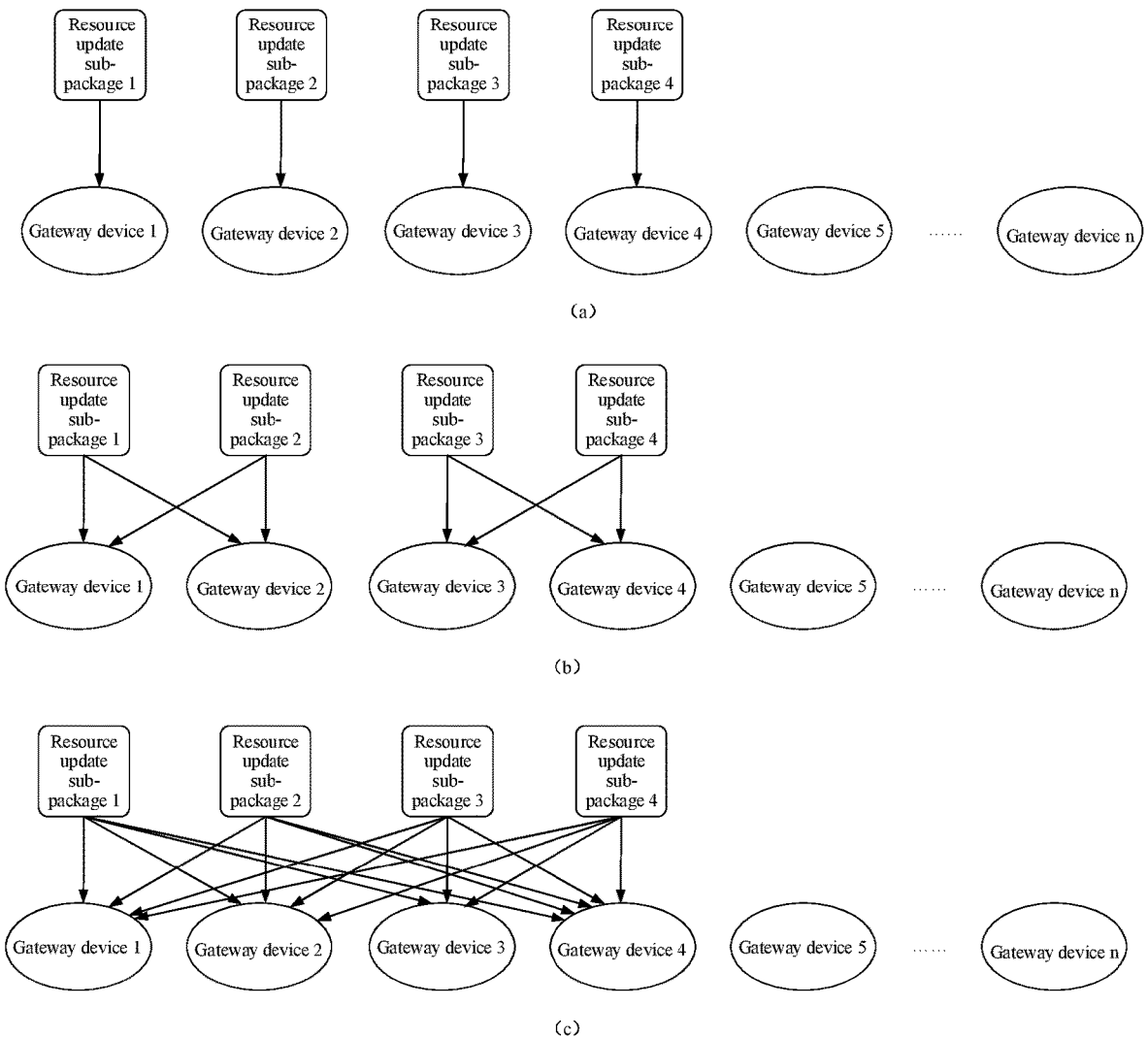
FIG. 6 is a schematic diagram of an incremental release process according to an exemplary embodiment of the present disclosure.

In an exemplary embodiment, as shown in FIG. 6(a), the gateway resource update package is divided into resource update sub-packages 1 to 4, and the four resource update sub-packages are sequentially deployed on gateway devices 1 to 4.

In 508, the $i^{th}$ resource update sub-package is cross-deployed in response to the $i^{th}$ resource update sub-package passing the deployment test at the $i^{th}$ target gateway device.

After the resource update sub-packages on the m target gateway devices are successfully deployed respectively, cross deployment is performed among the m target gateway devices.

In some embodiments, the IoT control platform cross-deploys the $i^{th}$ resource update sub-package in response to the $i^{th}$ resource update sub-package passing the deployment test at the $i^{th}$ target gateway device. Herein, the $i^{th}$ resource update sub-package is issued to target gateway devices except for the $i^{th}$ target gateway device during the cross-deployment.

In an exemplary embodiment, as shown in FIGS. 6(b) and (c), if the resource update sub-packages are successfully deployed on the gateway devices 1 to 4 respectively, the IoT control platform controls the cross-deployment of the resource update sub-packets among the gateway devices 1 to 4.

In 509, the resource update sub-package is rolled back in response to that the resource update sub-package fails to pass the deployment test at the target gateway device.

In the embodiment of the present disclosure, if there is a resource update sub-package that fails to deploy, all resource update sub-packets do not need to be rolled back, and only the resource update sub-package that fails to deploy needs to be rolled back to determine the error reason.

In 510, the gateway resource update package is issued to the remaining target gateway devices in response to that the m resource update sub-packages all pass the deployment test.

Optionally, refer to step 307 for the details of this step which is not repeated in the embodiment of the present disclosure herein.

In the embodiment of the present disclosure, the IoT control platform determines the associated template based on the model change message, and updates the associated template. Further, the IoT control platform determines the target gateway device that uses the associated template, and finally issues the gateway resource update package to the target gateway device, such that the IoT control platform can automatically package the gateway resource to be updated, thereby improving the resource update efficiency. Considering the second resource packaging task triggered by the technician manually on the configuration interface, the embodiment of the present disclosure further includes the content of priority execution of the second resource packaging task, such that the IoT control platform will not interfere with the operation of the technician in the process of automatically packaging the gateway resource to be updated.

Figure 7:
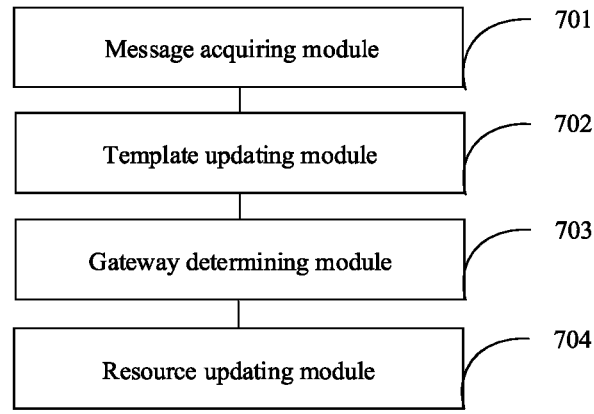
FIG. 7 is a structural block diagram of an apparatus for updating a gateway resource according to an exemplary embodiment of the present disclosure.

Refer to FIG. 7 which is a structural block diagram of a data packaging apparatus in an IoT system according to an exemplary embodiment of the present disclosure. The apparatus may be implemented as all or a part of the IoT control platform in FIG. 1 by software, hardware or a combination of the two. The apparatus is applicable to an IoT control platform, the IoT control platform is connected to each gateway device, and the gateway device is connected to an IoT device. The apparatus includes the following elements or modules.

A message acquirer or acquiring module 701 is configured to acquire a model change message including a change model identifier of a changed model, wherein different IoT devices correspond to different models, and each model contains measuring point information of a measuring point in the IoT device.

A template updater or updating module 702 is configured to determine an associated template based on the change model identifier and update the associated template, wherein the associated template contains a corresponding relationship between the measuring point information and a measuring point identifier in the changed model, and the measuring point identifier is applicable to a measuring point data message sent by the IoT device.

A gateway determiner or determining module 703 is configured to determine a target gateway device that uses the associated template.

A resource updater or updating module 704 is configured to issue a gateway resource update package to the target gateway device, wherein the target gateway device is configured to update the gateway resource based on the gateway resource update package.

Optionally, the resource updater or updating module 704 includes the following units.

A first updater or update unit is configured to construct the gateway resource update package.

A second updater or update unit is configured to divide the gateway resource update package into m resource update sub-packages, wherein m is less than a number of the target gateway devices.

A third updater or update unit is configured to issue the m resource update sub-packages to the m target gateway devices, the target gateway devices being configured to perform a deployment test of gateway resource update based on the received resource update sub-packages; and A fourth updater or update unit is configured to issue the gateway resource update package to the remaining target gateway devices in response to that the m resource update sub-packages all pass the deployment test.

Optionally, the first updater or update unit includes the following sub-units.

A first update sub-unit is configured to determine an incremental gateway resource in response to a change in the gateway resource.

A second update sub-unit is configured to acquire a history total gateway resource of the target gateway device, and construct a current total gateway resource based on the history total gateway resource and the incremental gateway resource.

A third update sub-unit is configured to construct the gateway resource update package based on the current total gateway resource.

Optionally, the apparatus further includes the following elements or modules.

A first updater or updating module is configured to calculate a first hash value based on the history total gateway resource, and calculate a second hash value based on the current total gateway resource.

A second updater or updating module is configured to determine a gateway device to be updated in response to that the first hash value is different from the second hash value.

Optionally, the first update sub-unit is further configured to generate a first resource packaging task and put the first resource packaging task into a lag queue, the first resource packaging task instructing to construct the current total gateway resource of the target gateway device; and execute the first resource packaging task in response to completion of a second resource packaging task in a priority queue, the second resource packaging task being a resource construction task triggered manually.

Optionally, the gateway determiner or determining module 703 includes the following units.

A first determination unit is configured to determine a target IoT device corresponding to the associated template.

A second determination unit is configured to determine a gateway device connected to the target IoT device as a target gateway device.

Optionally, the third update unit includes the following sub-units.

A sixth update sub-unit is configured to issue an $i^{th}$ resource update sub-package to an $i^{th}$ target gateway device, i being a positive integer less than or equal to m.

A seventh update sub-unit is configured to cross-deploy the $i^{th}$ resource update sub-package in response to the $i^{th}$ resource update sub-package passing a deployment test at the $i^{th}$ target gateway device, wherein during the cross-deployment, the $i^{th}$ resource update sub-package is issued to the target gateway device except for the $i^{th}$ target gateway device.

Optionally, the third update unit further includes the following sub-unit.

An eighth update sub-unit is configured to roll back the resource update sub-package in response to that the resource update sub-package fails to pass the deployment test at the target gateway device.

Figure 8:
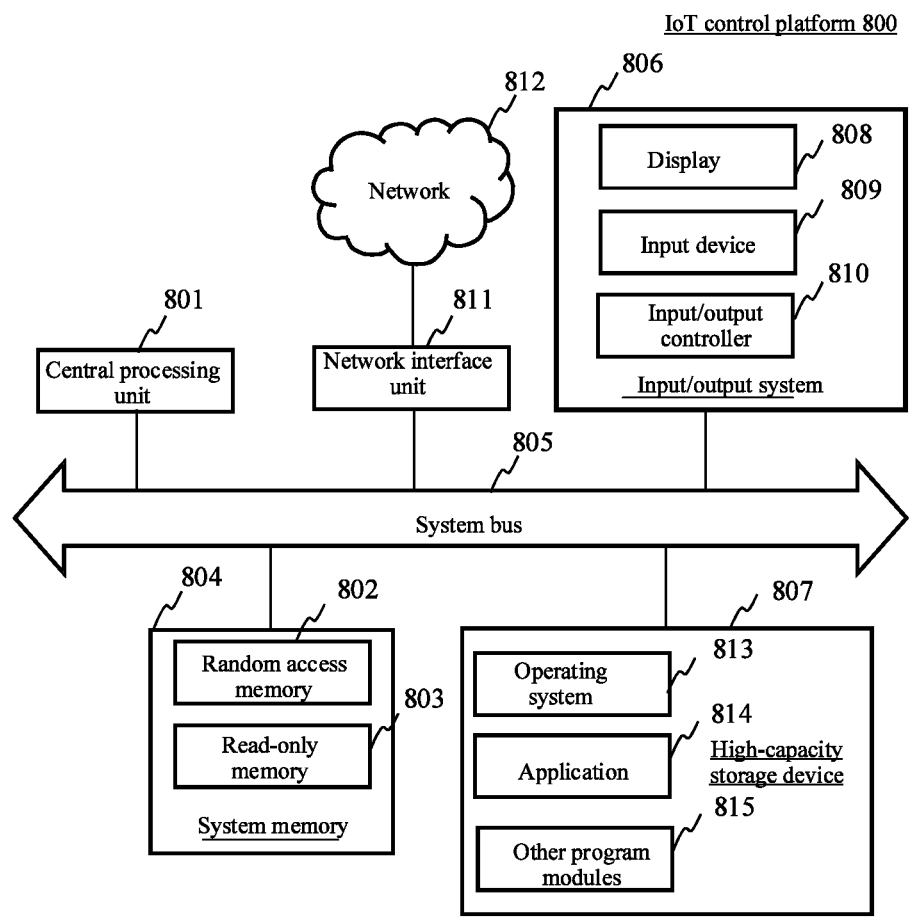
FIG. 8 is a schematic structure diagram of an IoT control platform according to an exemplary embodiment of the present disclosure.

Refer to FIG. 8 which is a schematic structural diagram of an IoT control platform 800 according to an exemplary embodiment of the present disclosure. The IoT control platform 800 includes a central processing unit (CPU) 801, a system memory 804 including a random access memory (RAM) 802 and a read-only memory (ROM) 803, and a system bus 805 connecting the system memory 804 and the CPU 801. The IoT control platform 800 also includes a basic input/output system (I/O system) 806 which helps transmit information between various components of the IoT control platform, and a high-capacity storage device 807 for storing an operating system 813, an application 814 and other program modules 815.

The basic I/O system 806 includes a display 808 for displaying the information and an input device 809, such as a mouse or keyboard, for the user to input information. The display 808 and the input device 809 are both connected to the CPU 801 via an input/output controller 810 that is connected to the system bus 805. The basic I/O system 806 may further include the input/output controller 810 for receiving and processing the input from a plurality of other devices, such as a keyboard, mouse, or electronic stylus. Similarly, the input/output controller 810 further provides output to a display screen, a printer or other types of output devices.

The high-capacity storage device 807 is connected to the CPU 801 by a high-capacity storage controller (not shown) connected to the system bus 805. The high-capacity storage device 807 and a computer-readable storage medium associated therewith provide non-volatile storage for the IoT control platform 800. That is, the high-capacity storage device 807 may include a computer-readable storage medium (not shown), such as a hard disk or a compact disc read-only memory (CD-ROM) drive.

Without loss of generality, the computer-readable storage medium may include a computer storage medium and a communication medium. The computer storage medium includes volatile and non-volatile, removable and non-removable media implemented in any method or technology for storage of information such as a computer-readable storage instruction, a data structure, a program module or other data. The computer storage medium includes an RAM, an ROM, an erasable programmable read only memory (EPROM), a flash memory or other solid-state storage technologies; a CD-ROM, a digital versatile disc (DVD) or other optical storage; and a tape cartridge, a magnetic tape, a disk storage or other magnetic storage devices. Of course, it will be known by a person skilled in the art that the computer storage medium is not limited to above. The above system memory 804 and the high-capacity storage device 807 may be collectively referred to as the memory.

The above memory further includes one or more programs. The one or more programs are stored in the memory and configured to be executed by the IoT control platform to perform steps in the method according to any one of the above embodiments.

The embodiments of the present disclosure further provide a computer-readable storage medium. The computer-readable storage medium stores at least one instruction, wherein the at least one instruction, when loaded and executed by a processor, causes the processor to perform the method for updating the gateway resource according to any one of the above embodiments.

The embodiments of the present disclosure further provide a computer program product. The computer program product stores at least one instruction, wherein the at least one instruction, when loaded and executed by a processor, causes the processor to perform the method for updating the gateway resource according to any one of the above embodiments.

Those skilled in the art will appreciate that in one or more examples described above, the functions described in the embodiments of the present disclosure may be implemented in hardware, software, firmware, or any combination thereof. When implemented in software, the functions may be stored in a computer-readable medium or transmitted as one or more instructions or codes on the computer-readable medium. The computer-readable medium includes both a computer storage medium and a communication medium including any medium that facilitates transfer of a computer program from one location to another. The storage medium may be any available medium that can be accessed by a general-purpose or special-purpose computer.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A method for updating a gateway resource, wherein the method is applicable to an Internet of Things (IoT) control platform connected to each gateway device, and the gateway device is connected to an IoT device, the method comprising:
    acquiring a model change message comprising a change model identifier of a changed model, wherein different IoT devices correspond to different models, and each model contains measuring point information of a measuring point in the IoT device;
    determining an associated template based on the change model identifier and updating the associated template, the associated template containing a corresponding relationship between the measuring point information and a measuring point identifier in the changed model, and the measuring point identifier being applicable to a measuring point data message sent by the IoT device;
    determining a target gateway device that uses the associated template; and
    issuing a gateway resource update package to the target gateway device, the target gateway device being configured to update the gateway resource based on the gateway resource update package, wherein issuing the gateway resource update package to the target gateway device comprises:
        constructing the gateway resource update package;
        dividing the gateway resource update package into m resource update sub-packages, wherein m is less than a number of target gateway devices;
        issuing the m resource update sub-packages to m of the target gateway devices, the target gateway devices being configured to perform a deployment test of gateway resource update based on the received resource update sub-packages; and
        issuing the gateway resource update package to remaining target gateway devices in response to that the m resource update sub-packages all pass the deployment test.

2. The method according to claim 1, wherein constructing the gateway resource update package comprises:
    determining an incremental gateway resource in response to a change in the gateway resource;
    acquiring a history total gateway resource of the target gateway device, and constructing a current total gateway resource based on the history total gateway resource and the incremental gateway resource; and
    constructing the gateway resource update package based on the current total gateway resource.

3. The method according to claim 2, wherein after acquiring the history total gateway resource of the target gateway device and constructing the current total gateway resource based on the history total gateway resource and the incremental gateway resource, the method further comprises:
    calculating a first hash value based on the history total gateway resource, and calculating a second hash value based on the current total gateway resource; and
    determining a gateway device to be updated in response to that the first hash value is different from the second hash value.

4. The method according to claim 2, wherein constructing the current total gateway resource comprises:
generating a first resource packaging task and putting the first resource packaging task into a lag queue, the first resource packaging task instructing to construct the current total gateway resource of the target gateway device; and
executing the first resource packaging task in response to completion of a second resource packaging task in a priority queue, the second resource packaging task being a resource construction task triggered manually.

5. The method according to claim 1, wherein determining the target gateway device that uses the associated template comprises:
determining a target IoT device corresponding to the associated template; and
determining a gateway device connected to the target IoT device as the target gateway device.

6. The method according to claim 1, wherein issuing the m resource update sub-packages to the m target gateway devices comprises:
issuing an $i^{th}$ resource update sub-package to an $i^{th}$ target gateway device, i being a positive integer less than or equal to m; and
cross-deploying the $i^{th}$ resource update sub-package in response to that the $i^{th}$ resource update sub-package passes a deployment test at the $i^{th}$ target gateway device, wherein during the cross-deployment, the $i^{th}$ resource update sub-package is issued to the target gateway device except for the $i^{th}$ target gateway device.

7. The method according to claim 6, wherein after cross-deploying the $i^{th}$ resource update sub-package, the method further comprises:
rolling back the resource update sub-package in response to that the resource update sub-package fails to pass the deployment test at the target gateway device.

8. An apparatus for updating a gateway resource, wherein the apparatus is applicable to an Internet of Things (IoT) control platform connected to each gateway device, and the gateway device is connected to an IoT device, the apparatus comprising:
a message acquirer configured to acquire a model change message comprising a change model identifier of a changed model, wherein different IoT devices correspond to different models, and each model contains measuring point information of a measuring point in the IoT device;
a template updater configured to determine an associated template based on the change model identifier and update the associated template, the associated template containing a corresponding relationship between the measuring point information and a measuring point identifier in the changed model, and the measuring point identifier being applicable to a measuring point data message sent by the IoT device;
a gateway determiner configured to determine a target gateway device that uses the associated template; and
a resource updater configured to issue a gateway resource update package to the target gateway device, the target gateway device being configured to update the gateway resource based on the gateway resource update package, wherein the resource updater comprises:
a first updater configured to construct the gateway resource update package;
a second updater configured to divide the gateway resource update package into m resource update sub-packages, wherein m is less than a number of target gateway devices;
a third updater configured to issue the m resource update sub-packages to m of the target gateway devices, the target gateway devices being configured to perform a deployment test of gateway resource update based on the received resource update sub-packages; and
a fourth updater configured to issue the gateway resource update package to remaining target gateway devices in response to that the m resource update sub-packages all pass the deployment test.

9. An Internet of Things (IoT) control platform, comprising:
a processors; and
a memory storing at least one instruction, at least one program, a code set, or an instruction set, wherein the at least one instruction, the at least one program, the code set, or the instruction set, when loaded and executed by the processor, causes the processor to perform a method for updating a gateway resource, wherein the method comprises:
acquiring a model change message comprising a change model identifier of a changed model, wherein different IoT devices correspond to different models, and each model contains measuring point information of a measuring point in the IoT device;
determining an associated template based on the change model identifier and updating the associated template, the associated template containing a corresponding relationship between the measuring point information and a measuring point identifier in the changed model, and the measuring point identifier being applicable to a measuring point data message sent by the IoT device;
determining a target gateway device that uses the associated template; and
issuing a gateway resource update package to the target gateway device, the target gateway device being configured to update the gateway resource based on the gateway resource update package, wherein issuing the gateway resource update package to the target gateway device comprises:
constructing the gateway resource update package;
dividing the gateway resource update package into m resource update sub-packages, wherein m is less than a number of target gateway devices;
issuing the m resource update sub-packages to m of the target gateway devices, the target gateway devices being configured to perform a deployment test of gateway resource update based on the received resource update sub-packages; and
issuing the gateway resource update package to remaining target gateway devices in response to that the m resource update sub-packages all pass the deployment test.

* * * * *

UNITED STATES PATENT AND TRADEMARK OFFICE
CERTIFICATE OF CORRECTION

PATENT NO. : 11,870,658 B2
APPLICATION NO. : 18/002383
DATED : January 9, 2024
INVENTOR(S) : Hongzhen Zhang It is certified that error appears in the above-identified patent and that said Letters Patent is hereby corrected as shown below:

In the Claims

Column 20, Claim 9, Line 19, delete "processors;" and insert in its place --processor;--.

Signed and Sealed this
Second Day of July, 2024

Katherine Kelly Vidal
*Director of the United States Patent and Trademark Office*